(12) United States Patent
Bao et al.

(10) Patent No.: US 7,550,989 B2
(45) Date of Patent: Jun. 23, 2009

(54) SYSTEM FOR AUTOMATIC MOUNTING OF WORKPIECES

(75) Inventors: Rong-Mou Bao, Shenzhen (CN); Yu-Wu Yang, Shenzhen (CN); Lie-Hui Zhu, Shenzhen (CN); Cheng-Bin Su, Shenzhen (CN); Chun-Nan Ou, Taipei Hsien (TW); Jian-Long Xing, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 259 days.

(21) Appl. No.: 11/616,883

(22) Filed: Dec. 28, 2006

(65) Prior Publication Data

US 2008/0074134 A1 Mar. 27, 2008

(30) Foreign Application Priority Data

Sep. 22, 2006 (CN) .................. 2006 2 0200791

(51) Int. Cl.
*G01R 31/26* (2006.01)
(52) U.S. Cl. ..................................... 324/765
(58) Field of Classification Search ................ 324/765, 324/158.1, 754, 761–762, 760; 258/48; 438/14–18
See application file for complete search history.

(56) References Cited

U.S. PATENT DOCUMENTS 6,150,830 A * 11/2000 Schmid et al. ............... 324/761
6,888,364 B2    5/2005 Cram
6,911,815 B2 *  6/2005 Jeon et al. ................ 324/158.1

* cited by examiner

*Primary Examiner*—Jermele M Hollington
*Assistant Examiner*—Tung X. Nguyen
(74) *Attorney, Agent, or Firm*—Wei Te Chung

(57) ABSTRACT

A system includes a mounting device (200), a detecting device (100), and a circuit (300). The mounting device includes a base (210), and a mounting head (220) opposite to the base. The detecting device is fixed on the base, and includes a shell (110) comprising a cavity (112) therein, a probe (130) fixed in the cavity and protruding towards the through hole, and a plug (150) having a pin (152) made of conductive materials. The shell further includes an opening (118) communicating with the cavity, and a through hole (114) formed opposite to the mounting head and communicating with the cavity. The pin is connected to the probe through the opening. The circuit includes a PLC circuit (320), and a power supply (310) connected with the PLC circuit. The pin connects with one of the PLC circuit and power circuit, and the mounting head connects with the remaining one.

16 Claims, 8 Drawing Sheets

SYSTEM FOR AUTOMATIC MOUNTING OF WORKPIECES

BACKGROUND OF THE INVENTION

1. Field of the Invention

The present invention pertains to a system for mounting, and particularly to a system for automatically mounting workpieces on an apparatus.

2. Description of Related Art

Automation technology is widely used in mounting of workpieces, and is commonly used to mount small metallic workpieces such as bolts. However, automation has resulted in fewer and fewer operators present during auto-mounting processes. Consequently, finding of mis-mounted workpieces is not consistent or thorough.

Therefore, a heretofore unaddressed need exists in the industry to overcome the aforementioned deficiencies and inadequacies.

SUMMARY OF THE INVENTION

In the exemplary embodiment, a system includes a mounting device, a detecting device, and a circuit. The mounting device includes a base, and a mounting head opposite to the base. The detecting device is fixed on the base, and includes a shell comprising a cavity therein, a probe fixed in the cavity, and a plug having a pin made of conductive materials thereon. The shell further includes an opening communicating with the cavity, and a through hole formed opposite to the mounting head and communicating with the cavity. The probe is made of conductive materials, and protrudes towards the through hole. The pin contacts with the probe through the opening. The circuit includes a PLC (Programmable Logic Controller) circuit, and a power supply electrically connected with the PLC circuit. The pin electrically connects with one of the PLC circuit and the power circuit, and the mounting head electrically connects with the remaining one of the PLC circuit and the power circuit.

Other advantages and novel features will become more apparent from the following detailed description when taken in conjunction with the accompanying drawings, in which:

DETAILED DESCRIPTION OF THE INVENTION

Figure 1:
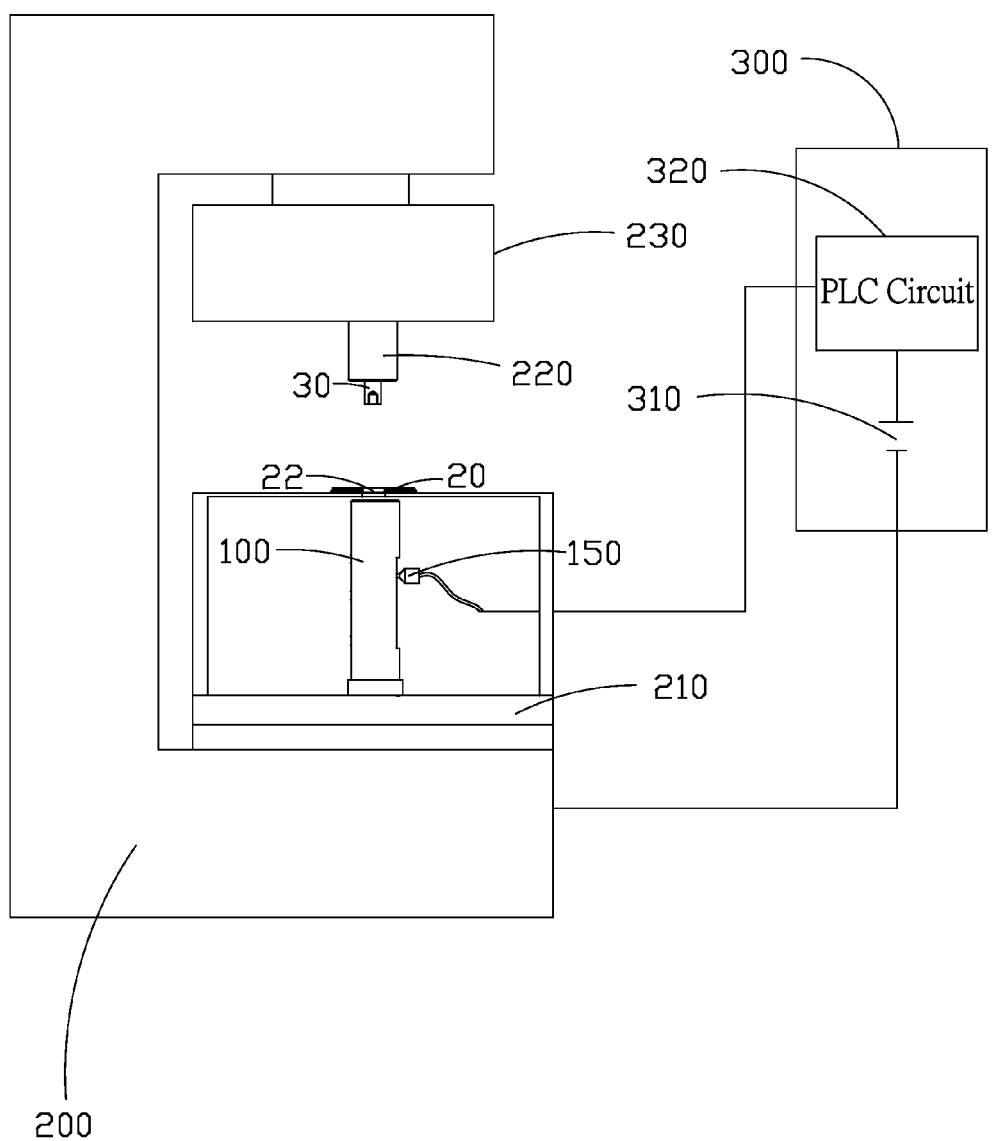
FIG. 1 is a schematic diagram of a system of an exemplary embodiment of the present invention, the system comprising a detecting device, a mounting device, and a circuit.

Referring to FIG. 1, a system 10 of the exemplary embodiment of the present invention comprises a mounting device 200, a detecting device 100, and a circuit 300.

The mounting device 200 comprises a base 210, a shell 230, and a mounting head 220 installed over the base 210. The shell 230 and the mounting head 220 are both made of conductive materials, and the shell 230 is electrically connected with the mounting head 220.

The detecting device 100 is fixed on the base 210, and opposite to the mounting head 220. A product 20 to be machined is fixed between the detecting device 100 and the mounting head 220. The product 20 defines a mounting hole 22. The mounting head 220 is used for impacting an accessory 30 made of conductive materials in the mounting hole 22 of the product 20.

Referring to FIG. 1 to FIG. 4, the detecting device 100 comprises a shell 110 defining a column-shaped cavity 112 therein. The top portion of the shell 110 defines a through hole 114 communicating with the cavity 112 and corresponding to the mounting hole 22 of the product 20. A radius of the through hole 114 is large enough so that the accessory 30 can pass through. The detecting device 100 further defines a plurality of threaded holes 116 on a sidewall of the shell 110 thereof. The threaded holes 116 communicate with the cavity 112, and are equidistantly arranged along a direction of an axis of the detecting device 100. And, on the sidewall of the shell 110 opposite to the threaded holes 116, the detecting device 100 also defines an opening 118.

Figure 5:
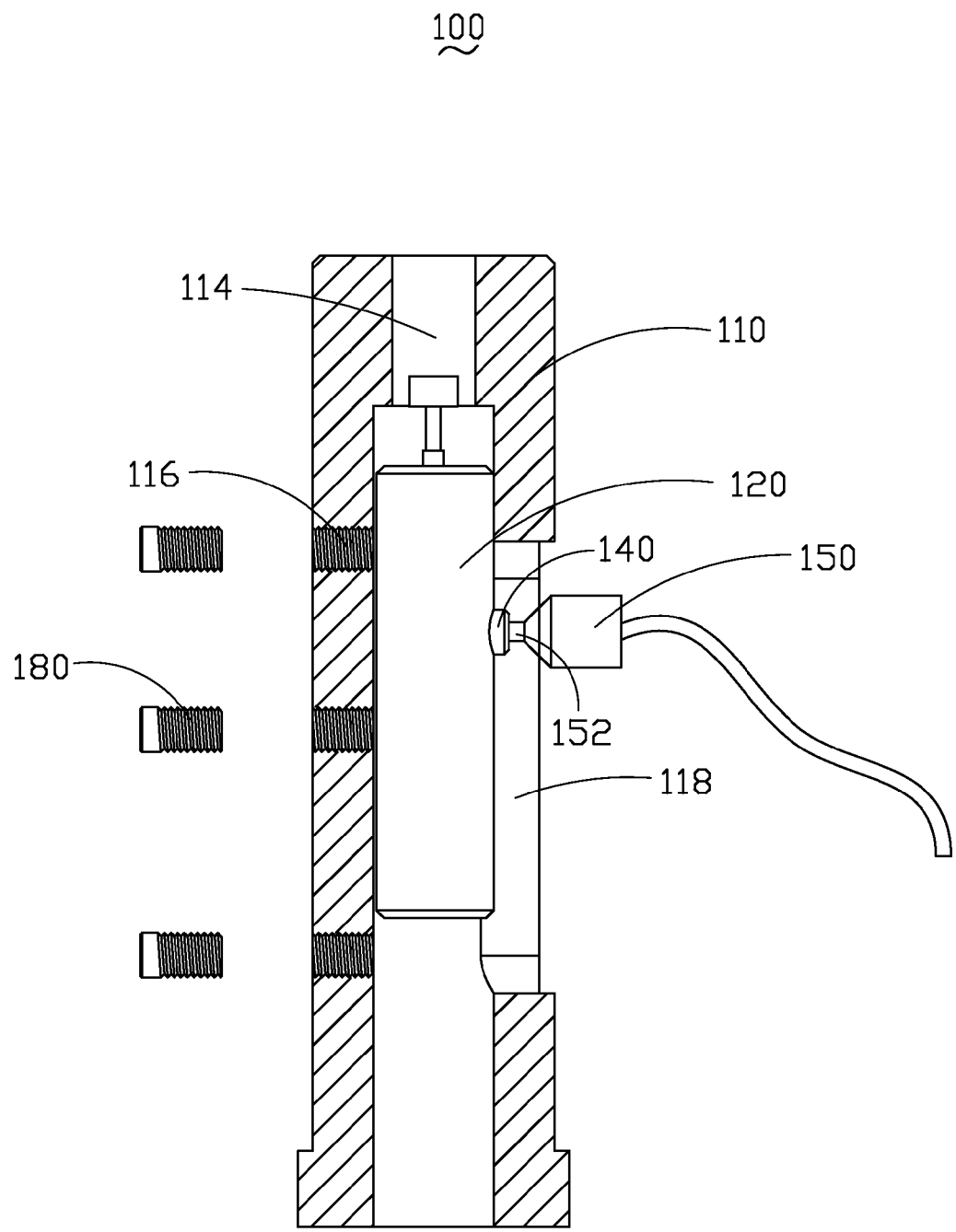
FIG. 5 is a partially cutaway view of the detecting device of FIG. 2.
Figure 6:
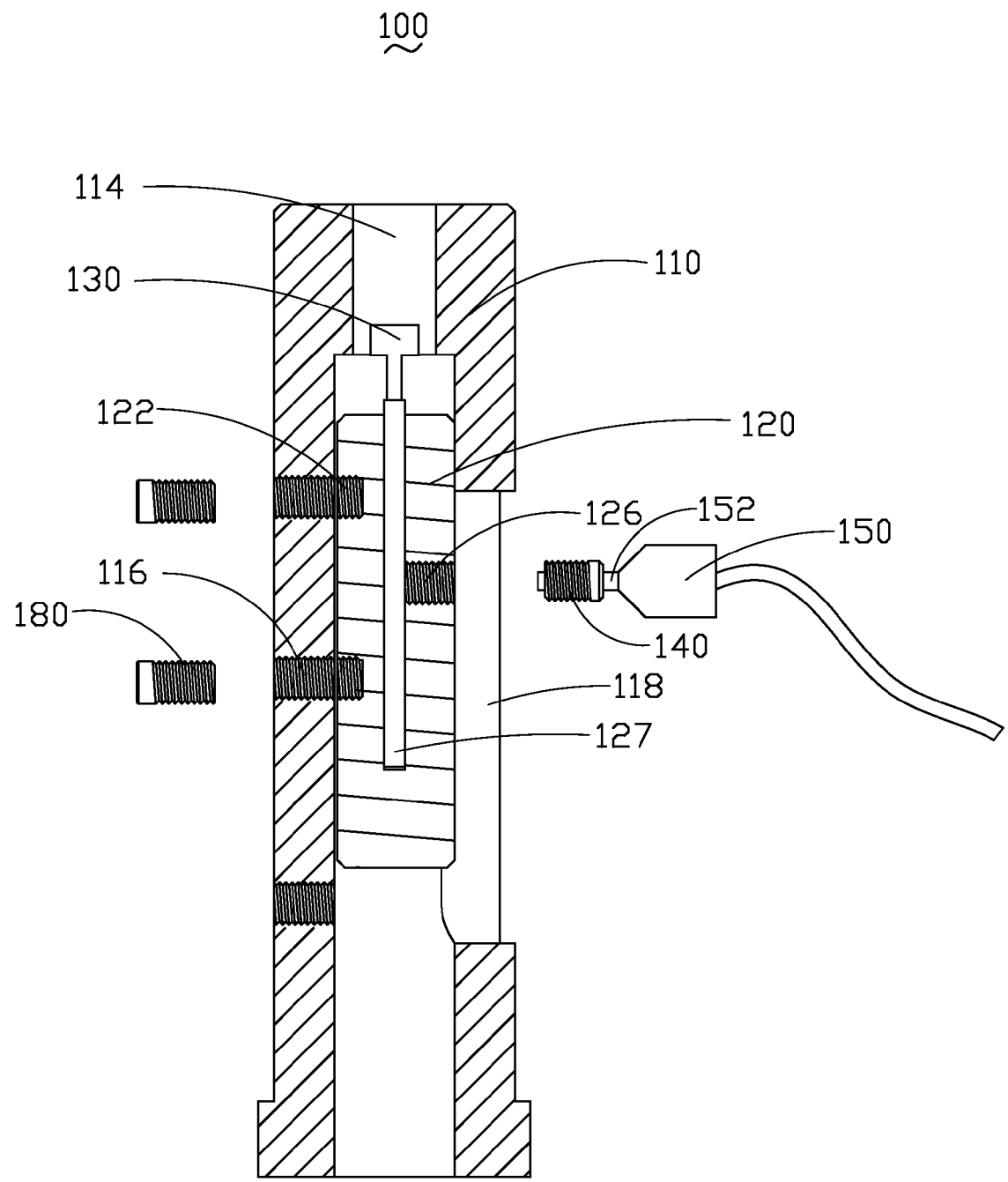
FIG. 6 is another partially cutaway view of the detecting device of FIG. 2.

Referring to FIG. 5 and FIG. 6, the detecting device 100 further comprises a retaining portion 120 made of insulating materials, received in the cavity 112. In this embodiment, the retaining portion 120 is column-shaped. The retaining portion 120 defines two mounting holes 122 corresponding to any two neighboring threaded holes 116. In this embodiment, the two mounting holes 122 are blind holes. Two fixing elements 180 are provided for fixing the retaining portion 120 in the cavity 112 through two neighboring threaded holes 116 and two corresponding mounting holes 122. In the exemplary embodiment, the fixing elements 180 are bolts. In other exemplary embodiment, the number of the mounting holes 122 can be one or more than two. And a shape of the mounting holes 122 and the threaded holes 116 can be either rectangular or circular, correspondingly, the fixing device 180 also can be other corresponding fixing elements. The retaining portion 120 and the cavity 112 can also be cubic shaped.

The retaining portion 120 defines a receiving hole 127 corresponding to the through hole 114, and the retaining portion 120 further comprises a conductive probe 130 received in the receiving hole 127, and the retaining portion 120 acts as an insulating layer between the probe 130 and the shell 110. The retaining portion 120 also defines a mounting hole 126 on a sidewall facing the opening 118. In the exemplary embodiment, the mounting hole 126 is a threaded hole. The retaining portion 120 also comprises a threaded connecting portion 140. The connecting portion 140 is made of insulating materials, and is fixed in the mounting hole 126.

Figure 2:
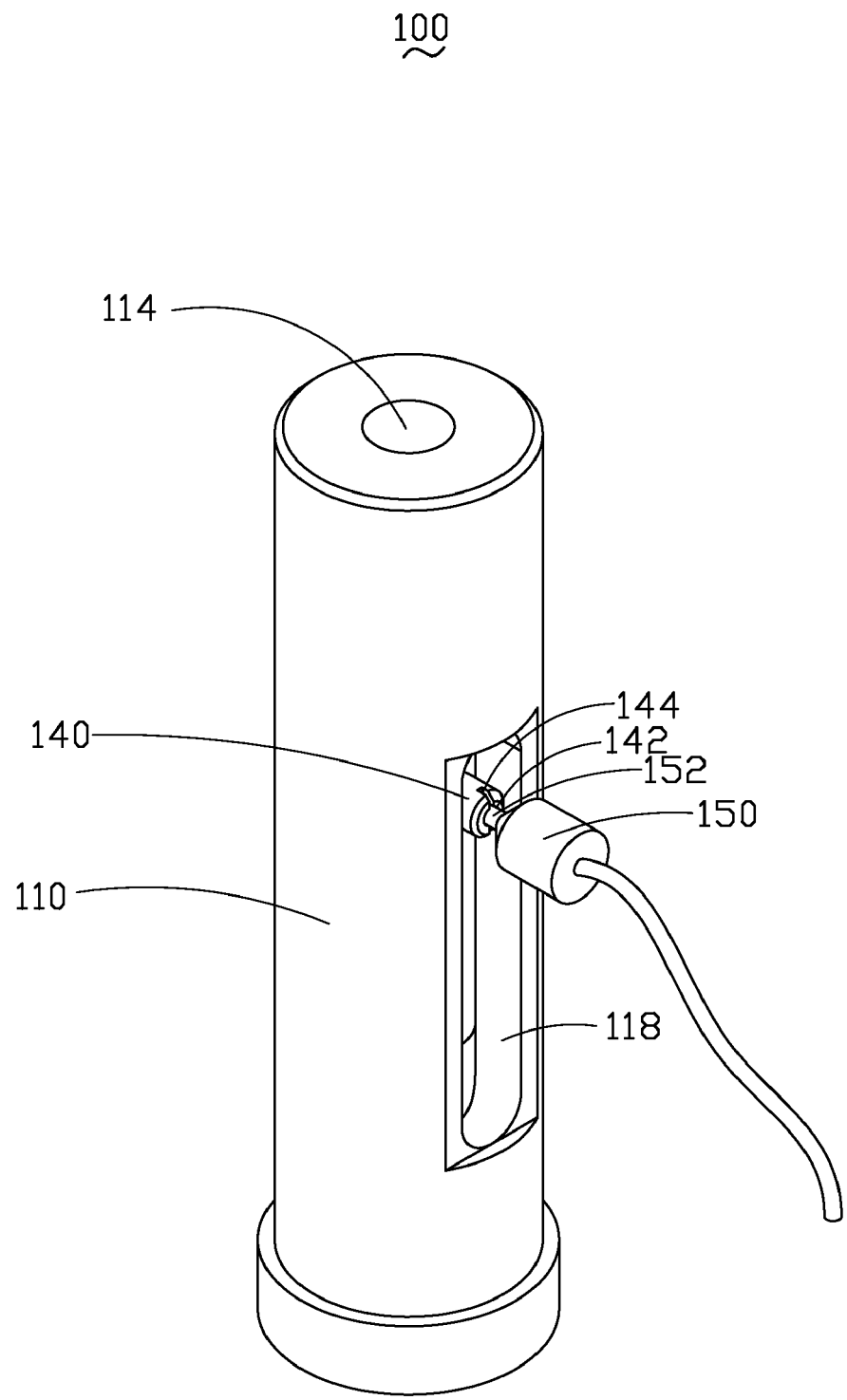
FIG. 2 is a perspective, assembled view of the detecting device of FIG. 1, the detecting device comprising a shell.
Figure 3:
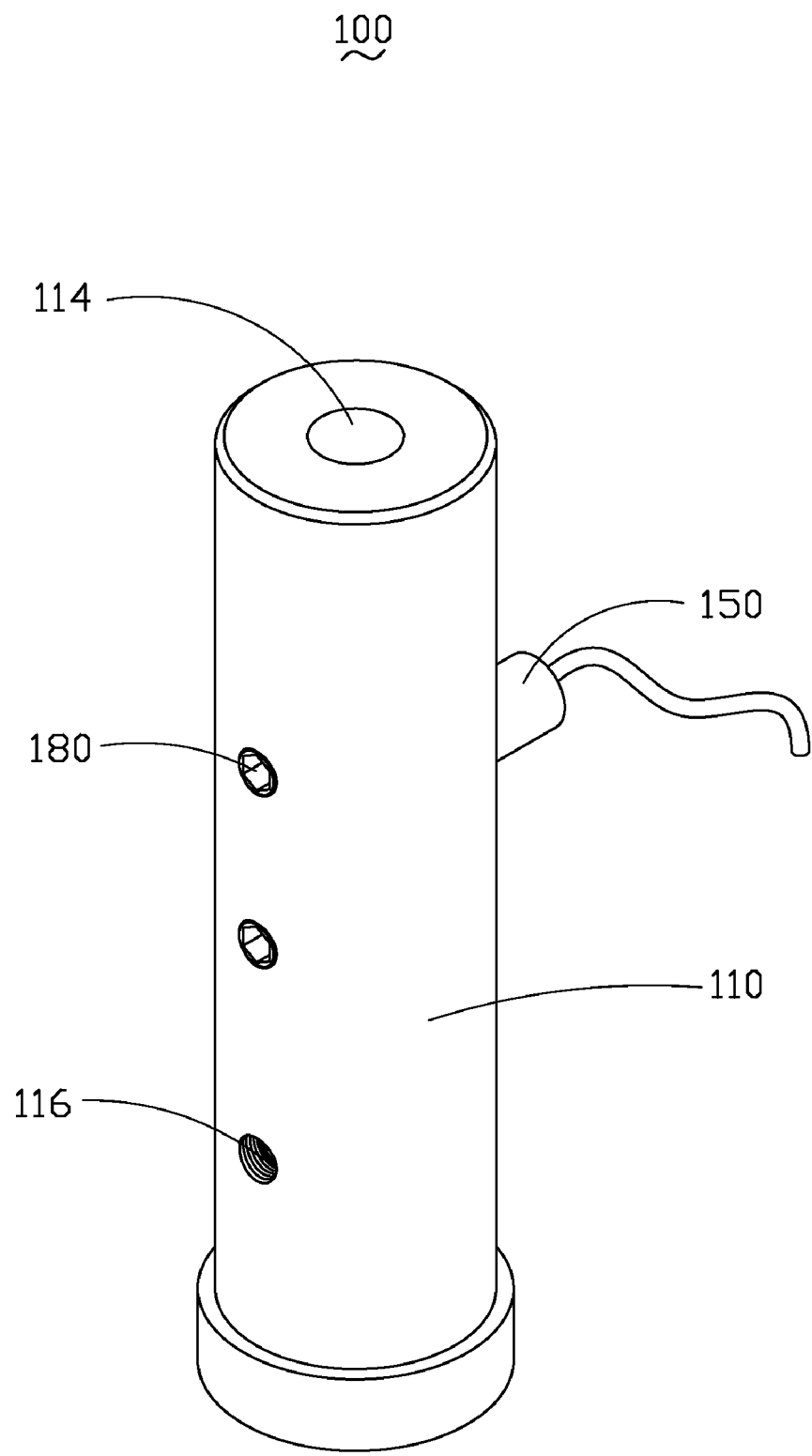
FIG. 3 is similar to FIG. 2, but viewed from another aspect.
Figure 4:
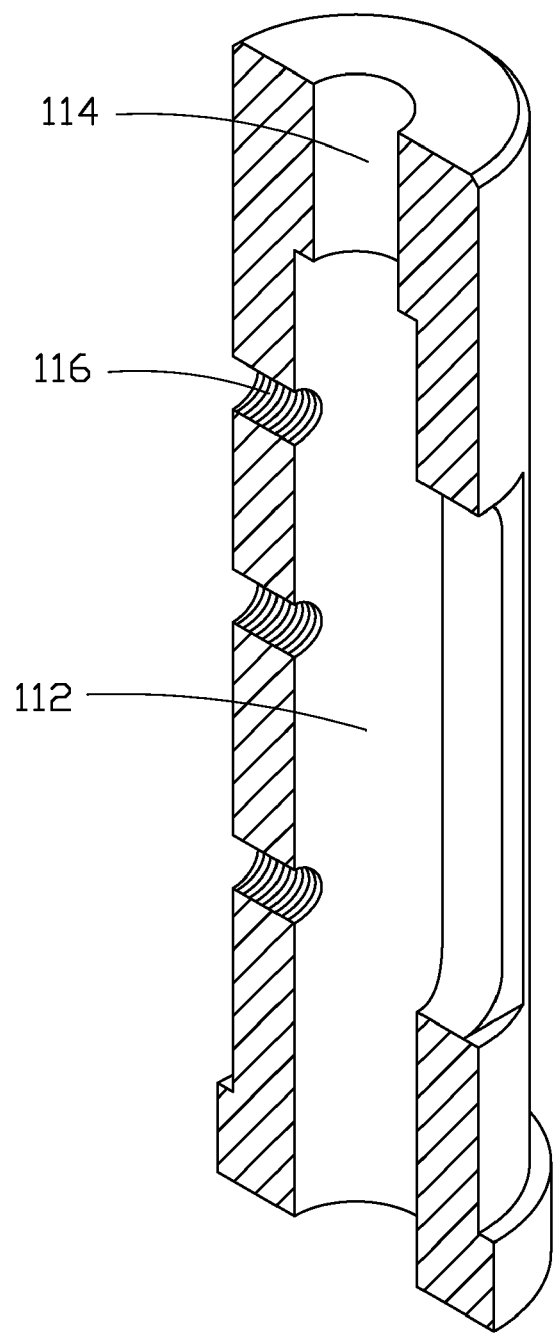
FIG. 4 is a cutaway view of the shell of FIG. 2.

Referring to FIG. 2 and FIG. 6, the connecting portion 140 defines a guide hole 142 communicating with the receiving hole 127. The detecting device 100 further comprises a plug 150 having a columned pin 152 made of conductive materials. A radius of the guide hole 142 is slightly smaller than that of the pin 152. In this embodiment, the connecting portion 140 further defines a pair of gaps 144 extending conversely from the guide hole 142 to sides of the connecting portion 140, for facilitating insertion of the pin 152.

Referring to FIG. 1, the circuit 300 comprises a power supply 310, and a PLC (Programmable Logic Controller) circuit 320 electrically connected to the power supply 310.

Referring to FIG. 1, in assembly, the electronic product 20 is fixed between the mounting head 220 and the detecting device 100. The accessory 30 is fixed on the mounting head 220. The pin 152 of the plug 150 is electrically connected to the PLC circuit 320. The shell 230 of the mounting device 200 is electrically connected to the power supply 310, and because the mounting head 220 electrically connects with the shell 230, the mounting head 220 is electrically connected to the power supply 310. In other exemplary embodiments, the pin 152 can also be electrically connected to the power supply 310, and the shell 230 of the mounting device 200 electrically connected to the PLC circuit 320.

Referring to FIG. 1 and FIG. 2, in use, the mounting head 220 impacts the accessory 30 in the mounting hole 22. The accessory 30 protrudes through the mounting hole 22 and the through hole 114, and contacts with the probe 130. Thereby, the mounting device 200, the detecting device 100, and the circuit 300 cooperatively form a circuit, and the power supply 310 outputs current through the PLC circuit 320, then, the PLC circuit 320 outputs a signal indicating that the accessory 30 has been mounted on the product. If the mounting device 100 fails to mount the accessory 30 on the product 20, there will be no circuit formed, and the power supply 310 will not generate current. At this time, the PLC circuit 320 will output a signal indicating that the accessory 30 is not mounted on the product 20, and the mounting device 200 will stop.

Referring to FIG. 6, because the detecting device 100 comprises the plurality of threaded holes 116, the retaining portion 120 can be adjustably mounted in any two neighboring threaded holes 116 of the detecting device 100 to accommodate various lengths of the accessory 30.

When the mounting device 200 fails to mount the accessory 30 on the product 20, the system 10 can output a signal to alert operators and stop the mounting device 200 instantly, which will help ensure safe production and quality of the product 20.

In other exemplary embodiments, the mounting device 200 can also mount a plurality of accessories 30 synchronously, resulting in a plurality of detecting devices 100 fixed on the base 210 of the mounting device 200. The pins 152 of the plurality of detecting devices 100 are electrically connected to one or more PLC circuits 320, that is, the system 10 of the present invention can also be used when a plurality of accessories 30 is mounted.

Figure 7:
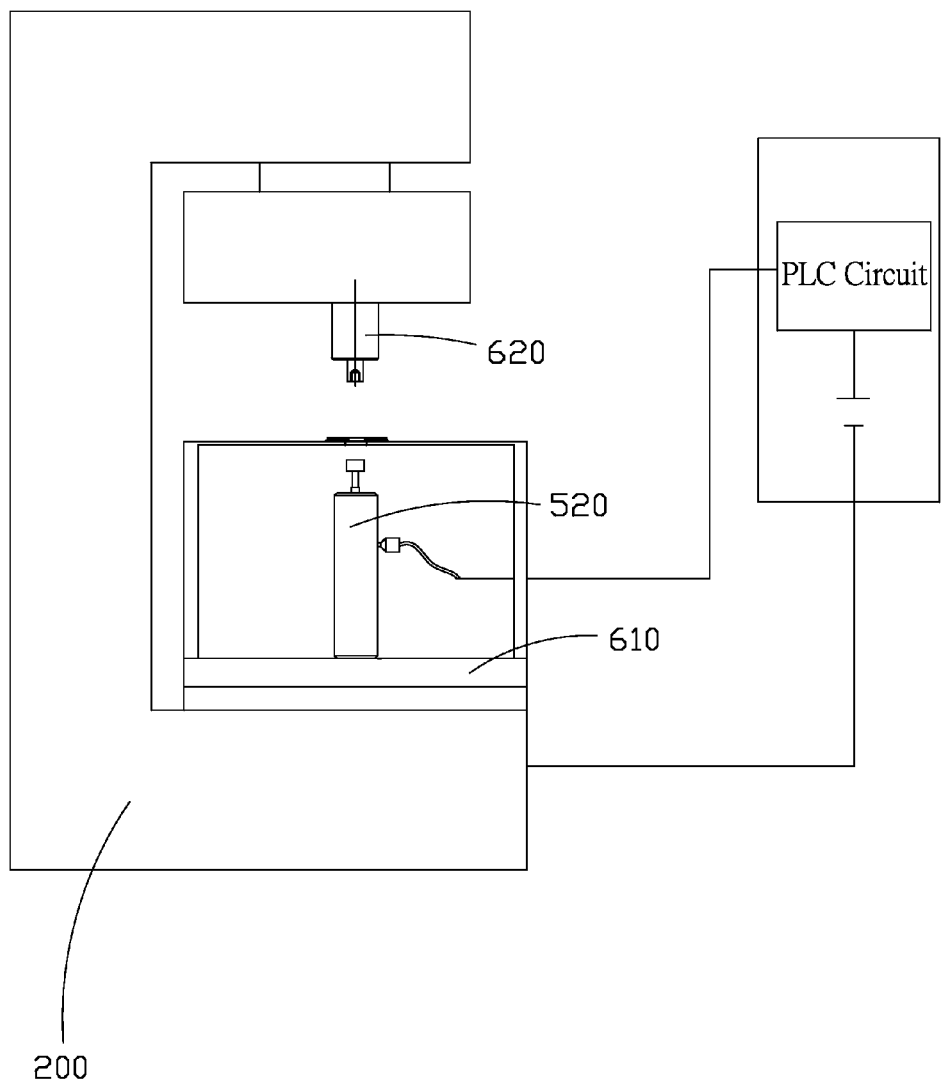
FIG. 7 is a schematic diagram of a test system of another exemplary embodiment of the present invention.

Referring to FIG. 7, a system 50 of another exemplary embodiment of the present invention is shown. The system 50 comprises a detecting device 500, a mounting device 600 having a base 610, and a mounting head 620. All elements, constructions, and functions of the exemplary embodiment are the same as the foregoing exemplary embodiment, except that the detecting device 500 does not comprise the shell, and the retaining portion 520 is directly fixed on the base 610 of the mounting device 600.

Figure 8:
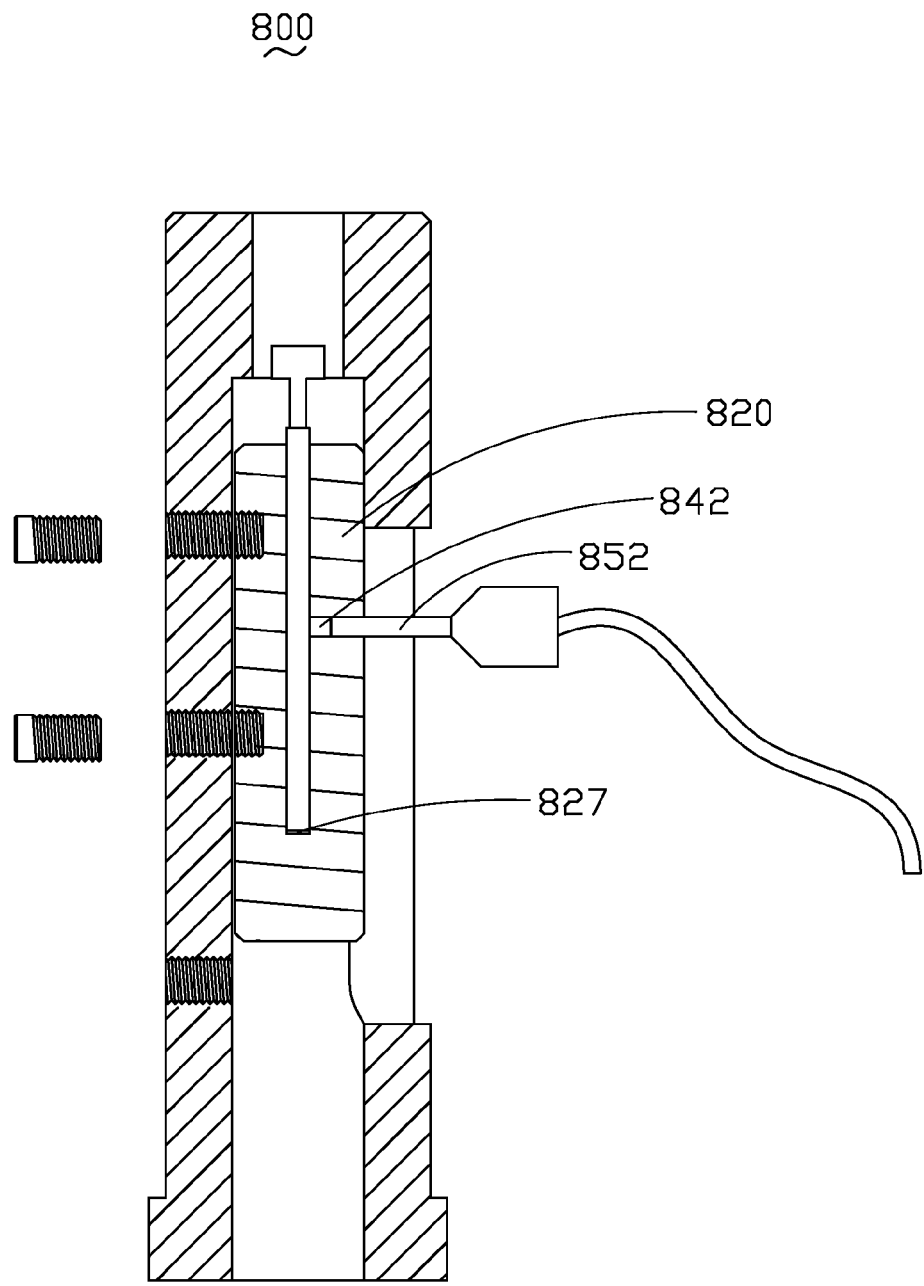
FIG. 8 is an exploded view of a detecting device of a third exemplary embodiment of the present invention.

Referring to FIG. 8, a detecting device 800 of a system of a third exemplary embodiment is shown. The detecting device 800 comprises a retaining portion 820. All elements, constructions, and functions of the exemplary embodiment are the same as the first exemplary embodiment, except that the retaining portion 820 defines a guide hole 842 in a side thereof. The guide hole 842 communicates with a receiving hole 827 of the retaining portion 820. And a pin 852 passes through the guide hole 842 and contacts with a probe 820 received in the receiving hole 827.

While exemplary embodiments have been described above, it should be understood that they have been presented by way of example only and not by way of limitation. Thus the breadth and scope of the present invention should not be limited by the above-described exemplary embodiments, but should be defined only in accordance with the following claims and their equivalents.

What is claimed is:

1. A system, comprising:
   a mounting device, comprising:
   a base; and
   a mounting head, opposite to the base;
   a detecting device, fixed on the base, comprising:
      a shell, comprising a cavity therein, an opening communicating with the cavity, and a through hole opposite to the mounting head, the through hole communicating with the cavity;
      a probe, made of conductive materials, fixed in the cavity and protruding towards the through hole; and
      a plug, comprising a pin made of conductive materials, the pin contacting with the probe through the opening; and
   a circuit, comprising a programmable logic controller circuit (PLC circuit), and a power supply electrically connecting with the PLC circuit,
   wherein the pin connects with one of the PLC circuit and the power circuit, and the mounting head connects with the remaining one of the PLC circuit and power circuit.

2. The system as claimed in claim 1, wherein the detecting device further comprises an insulating layer for insulating the probe from the shell.

3. The system as claimed in claim 1, wherein the detecting device further comprises a retaining portion fixed in the cavity, the retaining portion is made of insulating materials, and comprises a receiving hole for receiving the probe therein.

4. The system as claimed in claim 3, wherein the shell comprises a plurality of threaded holes, the retaining portion further comprises a plurality of mounting holes, and a plurality of fixing elements fix the retaining portion in the cavity through the mounting holes and some of the threaded holes.

5. The system as claimed in claim 3, wherein the retaining portion further comprises a guide hole communicating with the receiving hole and opposite to the opening, and the pin passes through the opening and the guide hole to contact with the probe.

6. The system as claimed in claim 3, wherein the retaining portion further comprises a mounting hole communicating with he receiving hole and opposite to the opening, and a connecting portion fixed in the mounting hole, the connecting portion comprises a guide hole communicating with the receiving hole through which the pin contacts with the probe.

7. The system as claimed in claim 6, wherein the mounting hole is a threaded hole, and the connecting portion is threaded therearound.

8. The system as claimed in claim 6, wherein a radius of the guide hole is smaller than that of the pin.

9. The system as claimed in claim 6, wherein the connecting portion further comprises a pair of gaps conversely extending from the guide holes to sides of the connecting portion.

10. A system for automatic mounting, comprising:
    a mounting device, comprising a base and a mounting head over and opposite to the base, the mounting head being electrically connected to the base; and
    a detect means insulatingly fixed on the base, comprising:
    a hollow shell comprising an opening on side wall thereof, and a through hole opposite to the mounting head, the through hole communicating with the opening;
    a probe configured in the hollow shell and protruding towards the through hole; and a plug electrically contacting with the probe through the opening; and a circuit, comprising a programmable logic controller circuit (PLC circuit) and a power supply electrically connected to the PLC circuit, wherein the plug is electrically connected to one of the PLC circuit and the power circuit, and the mounting head is electrically connected to the remaining one of the PLC circuit and the power circuit.

11. The system as claimed in claim 10, further comprising a retaining portion disposed in the hollow shell, the retaining portion further comprising a receiving hole to receive the probe, a mounting hole communicating with the receiving hole, and a connecting portion fixed in the mounting hole to define a guide hole therein.

12. The system as claimed in claim 11, wherein the mounting hole is a threaded hole, and the connecting portion is threaded therearound.

13. The system as claimed in claim 11, wherein the connecting portion comprises a pair of gaps conversely extending from the guide holes to sides of the connecting portion.

14. The system as claimed in claim 11, wherein the plug comprises a pin made of conductive materials and passing through the guide hole, a radius of the guide hole is smaller than that of the pin.

15. A system for automatically mounting and detecting mounting results, comprising:

a mounting device comprising a base for placing a product and a mounting head spaced from said base and holding an accessory so as to mount said accessory to said product when said mounting head moves toward said product;

a detecting device disposed beside said product placed on said base opposite to said mounting head, said detecting device comprising a retaining portion movably installable in said detecting device, a probe receivable in said retaining portion to be exposable toward said product so as to be physically and electrically contactable with said accessory which is completely mounted to said product, said retaining portion and said probe received therein able to position at more than one location inside said detecting device according to a length of said accessory so as to assure effectively physical and electrical contact between said probe and said accessory which is completely mounted to said product; and a circuit electrically connectable with said probe and said mounting head respectively so as to detect said contact between said probe and said accessory.

16. The system as claimed in claim 15, further comprising a plug removably installable to said retaining portion so to electrically connect said probe with said circuit.

* * * * *